United States Patent
Iizuka

(10) Patent No.: US 10,458,477 B2
(45) Date of Patent: Oct. 29, 2019

(54) SEAL FOR ROLLING BEARING AND ROLLING BEARING

(71) Applicant: Minebea Mitsumi Inc., Nagano (JP)

(72) Inventor: Osamu Iizuka, Kitasaku-gun (JP)

(73) Assignee: MINEBEA MITSUMI INC., Nagano (JP)

( * ) Notice: Subject to any disclaimer, the term of this patent is extended or adjusted under 35 U.S.C. 154(b) by 0 days.

(21) Appl. No.: 15/934,220

(22) Filed: Mar. 23, 2018

(65) Prior Publication Data
US 2018/0283455 A1    Oct. 4, 2018

(30) Foreign Application Priority Data

Mar. 28, 2017   (JP) ................................. 2017-063672
Dec. 22, 2017   (JP) ................................. 2017-246398

(51) Int. Cl.
*F16C 33/78*    (2006.01)
*F16C 19/06*    (2006.01)

(52) U.S. Cl.
CPC .......... *F16C 33/7823* (2013.01); *F16C 19/06* (2013.01); *F16C 33/7846* (2013.01); *F16C 33/7853* (2013.01); *F16C 33/7876* (2013.01)

(58) Field of Classification Search
CPC .............. F16C 33/7816; F16C 33/7823; F16C 33/783; F16C 33/784; F16C 33/7843; F16C 33/7853; F16C 33/7856; F16C 33/7846; F16C 33/7876

USPC ................ 277/349, 351, 353, 394, 402, 549
See application file for complete search history.

(56) References Cited

U.S. PATENT DOCUMENTS 9,816,560 B2 *  11/2017  Nakai ................. F16C 33/7823
2010/0142873 A1 *  6/2010  Sugiura ............... F16C 33/7823
                                                             384/477

FOREIGN PATENT DOCUMENTS

| FR | 2926345 | * | 7/2009 |
| JP | 2006-097851 A | | 4/2006 |
| JP | 2011-805247 | * | 4/2011 |

* cited by examiner

*Primary Examiner* — James Pilkington
(74) *Attorney, Agent, or Firm* — Pearne & Gordon LLP

(57) ABSTRACT

A seal for a rolling bearing includes a core metal and an elastic member configured to cover the core metal. A fitting portion is fixed to an outer ring and a seal portion contacts an inner ring. In the outer side of the seal portion an auxiliary lip projects without contacting the inner ring and in the inner side a main lip projects contacting the inner ring. An annular groove is formed between the main lip and a thick wall portion thus forming a flexible portion having a small wall thickness at a root portion of the main lip. The auxiliary lip inhibits intrusion of foreign substances and moisture, reduces external pressure acting on the main lip and ensures the sealing performance of the main lip. The flexible portion reduces the sliding resistance of the main lip.

10 Claims, 6 Drawing Sheets

|  | PRESENT EMBODIMENT | COMPARATIVE EXAMPLE 1 | COMPARATIVE EXAMPLE 2 | COMPARATIVE EXAMPLE 3 |
|---|---|---|---|---|
| TORQUE (RELATIVE VALUE ASSUMING COMPARATIVE EXAMPLE 1 BEING 100) | 46 | 100 | 116 | 14 |

FIG.7

|  |  | PRESENT EMBODIMENT | COMPARATIVE EXAMPLE 1 | COMPARATIVE EXAMPLE 2 | COMPARATIVE EXAMPLE 3 |
|---|---|---|---|---|---|
| ANDERON VALUE (AMOUNT OF INCREASE AFTER DUST TEST) | M BAND | 0.012 | 0.029 | 0.003 | 0.051 |
|  | H BAND | 0.000 | 0.012 | 0.014 | 0.080 |

FIG.8

SEAL FOR ROLLING BEARING AND ROLLING BEARING

CROSS REFERENCE TO RELATED APPLICATIONS

This application claims the benefit of Japanese Patent Application No. 2017-063672 and 2017-246398, respectively filed Mar. 28, 2017 and Dec. 22, 2017, which are hereby incorporated by reference in its entirety.

BACKGROUND

Technical Field

The present disclosure relates to a seal for a rolling bearing for sealing a space defined between an inner ring and an outer ring of the rolling bearing, and to the rolling bearing provided with the seal.

Background

A sealed rolling bearing is known where the rolling bearing is provided with a seal for hermetically sealing a space defined between an inner ring and an outer ring so as to prevent intrusion of moisture and foreign substances such as dust and, at the same time, to prevent leakage of a grease sealed in the inside of the bearing. The sealed rolling bearing is generally configured as follows. A seal member is an annular seal made of rubber reinforced by a core metal. The annular seal is fixed to one of the inner ring or the outer ring, and a lip portion of the seal member is brought into contact with the other of the inner ring or the outer ring so that the space defined between the inner and outer rings is sealed. A shape of the lip of the seal member is adapted so as to increase the sealing performance and, at the same time, to reduce the sliding resistance (rotation torque of bearing).

For example, Japanese Patent Application Laid-Open No. 2006-97851 discloses a sealing device where a main lip, contacting an outer peripheral surface of an inner ring, is formed on the inner side of the seal member in the axial direction, and a non-contact portion, forming a labyrinth seal in cooperation with the inner ring, is formed on the outer side of the seal member. In the sealing device, with the labyrinth seal formed by the non-contact portion, external pressure acting on the main lip is relaxed and, at the same time, intrusion of foreign substances is prevented. Further, the main lip is brought into contact with the outer peripheral surface of the inner ring so that uneven wear of the main lip is prevented.

SUMMARY

However, an object of the sealing device described in Japanese Patent Application Laid-Open No. 2006-97851 is mainly to withstand an external high pressure. Accordingly, the sealing device has a structure where a core metal extends to an area in the vicinity of an edge portion of the main lip, and a root portion of the main lip has a large wall thickness so that the main lip is minimally deflected. Therefore, a sliding resistance between the main lip and the inner ring increases so that a rotation torque of the rolling bearing increases.

The present disclosure is related to providing a seal for a rolling bearing and a sealed rolling bearing where a required sealing performance is maintained and, at the same time, a sliding resistance (a rotation torque of a bearing) is reduced.

According to a first aspect of the present disclosure, there is provided a seal for a rolling bearing having an inner ring and an outer ring, wherein the seal is to be fixed to the outer ring for sealing a space defined between the inner ring and the outer ring. The seal includes an annular core metal extending between the inner ring and the outer ring and an elastic member configured to cover at least a portion of the core metal. The elastic member includes a seal portion configured to cover an inner surface and an outer surface of an inner peripheral portion of the core metal in an axial direction of the rolling bearing. The seal portion includes a thick wall portion configured to cover the inner surface of the core metal, and the thick wall portion is thicker than a portion of the seal portion covering the outer surface of the core metal. An auxiliary lip and a main lip are formed in an inner peripheral portion of the seal portion. The auxiliary lip is in a non-contact state in relation to an outer peripheral surface of the inner ring with a gap between the auxiliary lip and the outer peripheral surface. The main lip is formed at an axially inner side of the auxiliary lip and contacts the outer peripheral surface of the inner ring. An annular groove opening toward the inner side in the axial direction is formed between the thick wall portion and the main lip of the seal portion thus forming a flexible portion having a small wall thickness at a root portion of the main lip.

According to a second aspect of the present disclosure, there is provided a seal for a rolling bearing having an inner ring and an outer ring, wherein the seal is to be fixed to the inner ring for sealing a space defined between the inner ring and the outer ring. The seal includes an annular core metal extending between the inner ring and the outer ring and an elastic member configured to cover at least a portion of the core metal. The elastic member includes a seal portion configured to cover an inner surface and an outer surface of an outer peripheral portion of the core metal in an axial direction of the rolling bearing. The seal portion includes a thick wall portion configured to cover the inner surface of the core metal, and the thick wall portion is thicker than a portion of the seal portion covering the outer surface of the core metal. An auxiliary lip and a main lip are formed in an outer peripheral portion of the seal portion. The auxiliary lip is in a non-contact state in relation to an inner peripheral surface of the outer ring with a gap between the auxiliary lip and the inner peripheral surface. The main lip is formed at an axially inner side of the auxiliary lip and contacts the inner peripheral surface of the outer ring. An annular groove opening toward the inner side in the axial direction is formed between the thick wall portion and the main lip of the seal portion thus forming a flexible portion having a small wall thickness at a root portion of the main lip.

BRIEF DESCRIPTION OF THE DRAWINGS

FIG. 7 is a table showing the results of the torque measurement test performed on the rolling bearing of the present embodiment and the comparative examples;

FIG. 8 is a table showing the results of the dust test performed on the rolling bearing of the present embodiment and the comparative examples.

DETAILED DESCRIPTION

Hereinafter, embodiments of the present disclosure will be described in detail with reference to the accompanying drawings.

With respect to a rolling bearing according to the present embodiment, the description is made by exemplifying a ball bearing of a small size having an outer diameter of approximately 10 mm, and used in a motor incorporated in home appliances or an information and communication apparatus such as a personal computer, a control motor of an automobile, a blower, a fan motor or the like. However, a seal and rolling bearing according to the present disclosure is not limited to such application and size.

Figure 1:
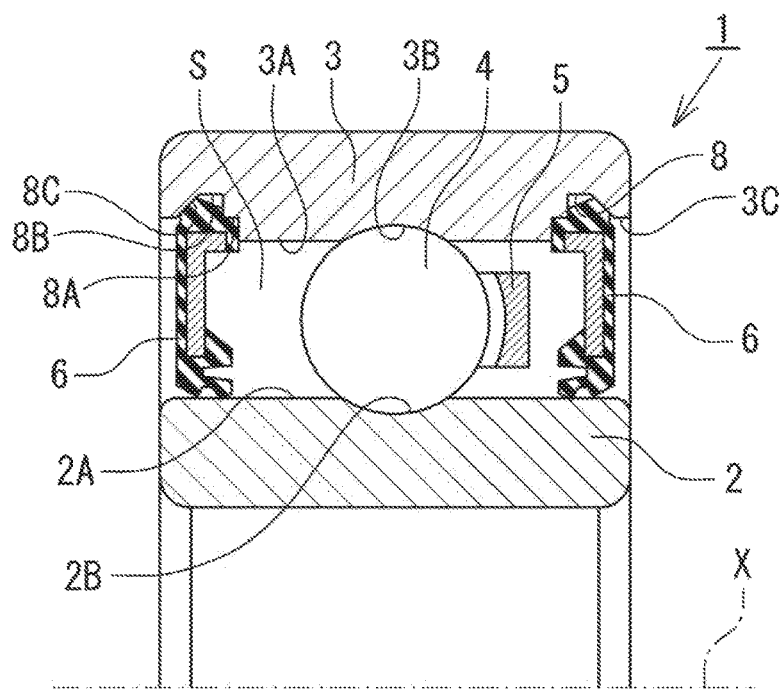
FIG. 1 is a partial cross-sectional view of a rolling bearing according to an embodiment of the present disclosure.

FIG. 1 is a partial cross-sectional view of a rolling bearing 1 according to the present embodiment. In the description made hereinafter, a direction of a rotational axis X of the rolling bearing 1 shown in FIG. 1 is referred to as an axial direction. A direction perpendicular to the axial direction is referred to as a radial direction. As shown in FIG. 1, the rolling bearing 1 according to the present embodiment is a sealed ball bearing. The rolling bearing 1 includes an inner ring 2, an outer ring 3, a plurality of rolling bodies 4 (steel balls), and a retainer 5. Raceway surfaces 2B are formed on an outer peripheral surface 2A of the inner ring 2, raceway surfaces 3B are formed on an inner peripheral surface 3A of the outer ring 3, and the plurality of rolling bodies 4 are accommodated between the raceway surfaces 2B and the raceway surfaces 3B. The retainer 5 retains these rolling bodies 4 on the raceway surfaces 2B, 3B at predetermined intervals. Seal for rolling bearings 6, 6 (hereinafter simply referred to as "seals") having an annular shape are mounted at both end portions of the rolling bearing 1 in the axial direction such that the seals 6, 6 are fixed to the outer ring 3. The seals 6, 6 seal an annular space S defined between the inner ring 2 and the outer ring 3. An appropriate amount of grease is held in the annular space S.

Except for the raceway surfaces 2B at a central portion in the axial direction, the outer peripheral surface 2A of the inner ring 2 has a cylindrical surface having a constant diameter. Annular seal grooves 8, 8 are formed on both end portions of the inner peripheral surface 3A of the outer ring 3 in the axial direction along the circumferential direction. The seals 6, 6 are mounted in the annular seal grooves 8, 8. Each seal groove 8 has a stepped shape having a small diameter portion 8A disposed inward in the axial direction and a large diameter portion 8B disposed outward in the axial direction. An outer side wall of the large diameter portion 8B forms a tapered portion 8C that is inclined. Inner periphery end portions 3C at both ends of the outer ring 3, that is, outer portions of the seal grooves 8, 8 in the axial direction have a diameter larger than the diameter of the inner peripheral surface 3A. The seals 6, 6 mounted on both end portions of the rolling bearing 1 have substantially the similar structure. Accordingly, only one seal 6 (the seal 6 on the right side in FIG. 1) will be described in detail hereinafter.

Figure 2:
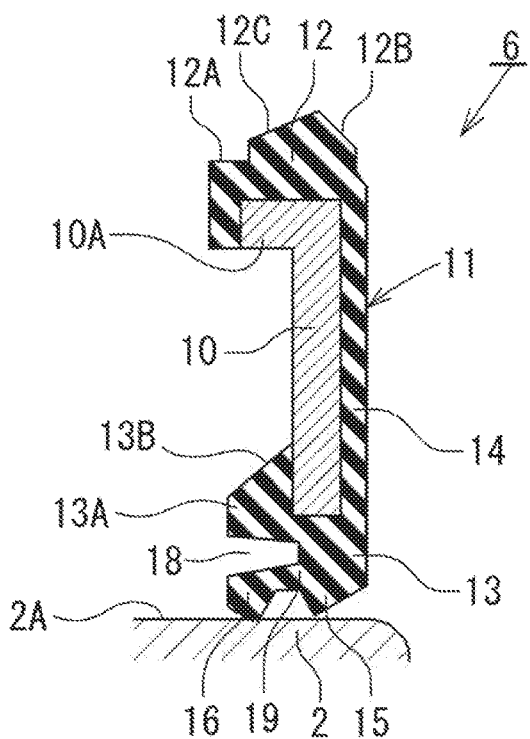
FIG. 2 is an enlarged cross-sectional view showing a seal of the rolling bearing shown in FIG. 1.

Referring to FIG. 2, the seal 6 comprises a core metal 10 made of metal and an elastic member 11 made of rubber. The elastic member 11 covers at least a portion of the core metal 10.

The core metal 10 is an annular member extending in the radial direction between the outer peripheral surface 2A of the inner ring 2 and the inner peripheral surface 3A of the outer ring 3. An inner peripheral portion of the core metal 10 extends to an area in the vicinity of the outer peripheral surface 2A of the inner ring 2. An outer peripheral portion of the core metal 10 extends to a position approximately reaching the inner peripheral surface 3A of the outer ring 3. The outer peripheral portion of the core metal 10 is bent at a right angle toward the inner side of the rolling bearing 1 thus forming a cylindrical portion 10A extending along the inner peripheral surface 3A of the outer ring 3. The core metal 10 is molded into the elastic member 11 so that a periphery of the core metal 10 is covered by the elastic member 11. However, a region ranging from an inner peripheral surface of the cylindrical portion 10A to a portion in the vicinity of the inner peripheral portion of the end surface facing the inside of the rolling bearing 1 is exposed. The core metal 10 reinforces the elastic member 11, and maintains the shape of the seal 6 when submitted to an external force.

The elastic member 11 of the seal 6 is an annular member where a fitting portion 12 disposed on the outer periphery side, a seal portion 13 disposed on the inner periphery side, and an intermediate portion 14 are formed into an integral body. The fitting portion 12 covers the outer periphery side of the core metal 10, and is fitted in the seal groove 8 of the outer ring 3 thus being fixed to the outer ring 3. The seal portion 13 covers the inner periphery side of the core metal 10, and a portion (a main lip 16 described later) of the seal portion 13 contacts the outer peripheral surface 2A of the inner ring 2. The intermediate portion 14 is disposed between the fitting portion 12 and the seal portion 13. The fitting portion 12 includes a stepped portion 12A, an inclined portion 12B, and an inclined surface 12C. The stepped portion 12A is fitted in the small diameter portion 8A and the large diameter portion 8B of the seal groove 8 of the outer ring 3. The inclined portion 12B is fitted in the tapered portion 8C. The inclined surface 12C is formed between the stepped portion 12A and the inclined portion 12B. The fitting portion 12 is fitted to an inner surface of the seal groove 8 so that the seal 6 is fixed to the outer ring 3. The intermediate portion 14 covers the outer side of the core metal 10 in the axial direction, and joins the fitting portion 12 and the seal portion 13.

Next, the seal portion 13 of the elastic member 11 will be described with reference to FIG. 3, FIGS. 4A and 4B.

The seal portion 13 is formed such that the seal portion 13 covers an axially inner surface and an axially outer surface of the inner peripheral portion of the core metal 10 thus facing the outer peripheral surface 2A of the inner ring 2. The seal portion 13 includes a thick wall portion 13A. The thick wall portion 13A has a wall thickness larger than the thickness of a portion of the seal portion 13 covering an axially outer surface of the core metal 10. The thick wall portion 13A covers an axially inner surface of the inner peripheral portion of the core metal 10. An outer peripheral surface of the thick wall portion 13A forms a tapered surface 13B where the core metal 10 side of the tapered surface 13B has a larger diameter. An auxiliary lip 15 and a main lip 16 are respectively formed on the outer side and the inner side of an inner peripheral portion of the seal portion 13 in the axial direction. The auxiliary lip 15 and the main lip 16 project toward the outer peripheral surface 2A of the inner ring 2. An inner peripheral groove 17 facing the outer peripheral surface 2A of the inner ring 2 is formed between the auxiliary lip 15 and the main lip 16.

A minute gap H is formed between an edge portion of the auxiliary lip 15 and the outer peripheral surface 2A of the inner ring 2 so that the edge portion of the auxiliary lip 15 is in a non-contact state with the outer peripheral surface 2A. On the other hand, an edge portion of the main lip 16 contacts the outer peripheral surface 2A of the inner ring 2 with the predetermined interference. Each of the edge portion of the auxiliary lip 15 and the edge portion of the main lip 16 is formed into a V shape in cross section where the axially inner side and the axially outer side of the edge portion are inclined. The edge portion of the auxiliary lip 15 is disposed in the radially inner side of the core metal 10. That is, the edge portion of the auxiliary lip 15 is disposed at a position where the axial position of the edge portion of the auxiliary lip 15 overlaps with the axial position of the core metal 10. The edge portion of the main lip 16 is disposed in the axially inner side of the core metal 10. That is, the edge portion of the main lip 16 is formed at a position located in the radially inner side of the thick wall portion 13A.

Figures 4A, 4B:
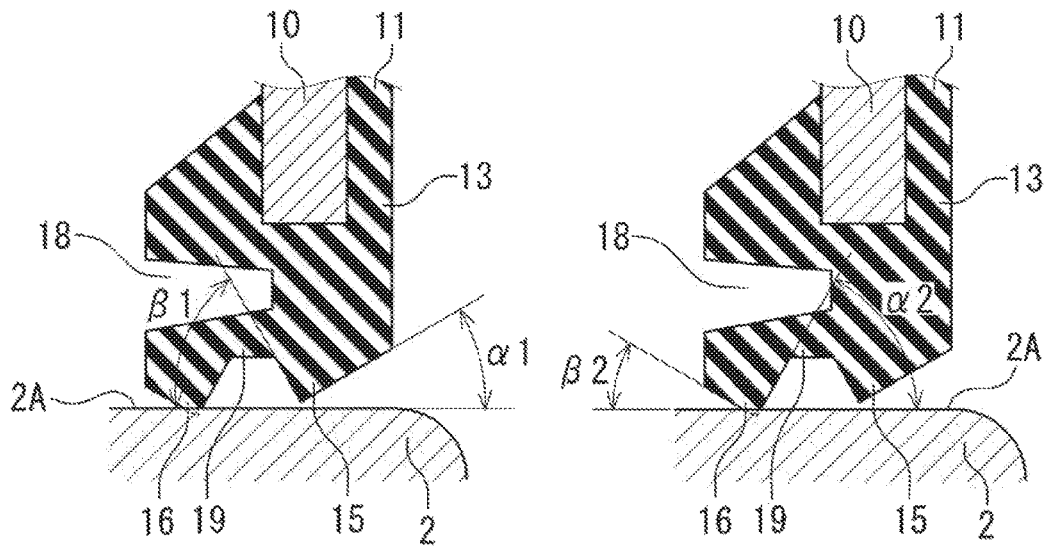
FIG. 4A and FIG. 4B are explanatory views showing inclination angles of a main lip and an auxiliary lip of the seal portion shown in FIG. 3.

As shown in FIG. 4A, an inclination angle $\alpha 1$ between a surface of the auxiliary lip 15 disposed outward in the axial direction and the outer peripheral surface 2A of the inner ring 2 is smaller than an inclination angle $\beta 1$ between a surface of the auxiliary lip 15 disposed inward in the axial direction and the outer peripheral surface 2A of the inner ring 2. As shown in FIG. 4B, an inclination angle $\beta 2$ between a surface of the main lip 16 disposed inward in the axial direction and the outer peripheral surface 2A of the inner ring 2 is smaller than an inclination angle $\alpha 2$ between a surface of the main lip 16 disposed outward in the axial direction and the outer peripheral surface 2A of the inner ring 2.

Figure 3:
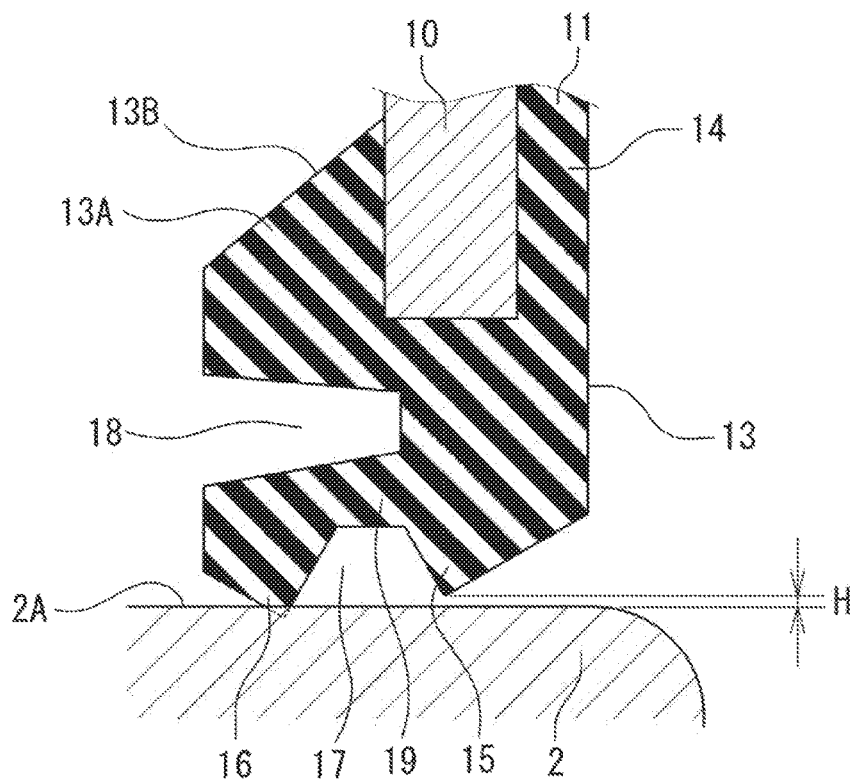
FIG. 3 is an enlarged cross-sectional view showing a seal portion corresponding to the essential part of the seal shown in FIG. 2.

As shown in FIG. 3, an annular groove 18 is formed between the thick wall portion 13A and the main lip 16 of the seal portion 13. The annular groove 18 is disposed at a position located in the radially inner side of the core metal 10 of the seal portion 13. The annular groove 18 opens toward the axially inner side of the seal portion 13, and extends axially to have a depth allowing the annular groove 18 to reach the inner periphery side of the core metal 10 in the radial direction. Both side walls of the annular groove 18 are formed into a tapered shape so that the width of the annular groove 18 is gradually narrowed toward a bottom portion. With the formation of the annular groove 18 and the inner peripheral groove 17 between the auxiliary lip 15 and the main lip 16, a flexible portion 19 having a small wall thickness is formed at a root portion of the main lip 16. The flexible portion 19 extends inward in the axial direction from the auxiliary lip 15 side. The flexible portion 19 is a thin wall portion included in the root portion of the main lip 16, and having a wall thickness smaller than a thickness in the radial direction from the annular groove 18 to the edge portion of the main lip 16. In the example shown in the drawing, the main lip 16 extends axially inward to a position which coincides with an end surface of the thick wall portion 13A. However, the main lip 16 may extend axially to a position which exceeds the end surface of the thick wall portion 13A. Alternatively, the main lip 16 may extend axially to a position which does not exceed the end surface of the thick wall portion 13A.

As described above, in the main lip 16 extending inward in the axial direction from a body portion of the seal portion 13, the edge portion connected to the body portion of the seal portion 13 through the flexible portion 19 contacts the non-stepped outer peripheral surface 2A of the inner ring 2, from the radial direction. With the seal 6 having such a structure, the contact pressure between the inner ring 2 is lowered so that the sliding resistance is reduced and hence, the rotation torque of the inner ring 2 can be reduced.

Note that although the corners of the elastic member 11 of the seal 6 shown in the drawing are not chamfered or rounded in the cross section, any of the corners may be chamfered or rounded when necessary.

Next, the manner of operation of the rolling bearing 1 according to the present embodiment having the above-mentioned configuration will be described.

In the rolling bearing 1, the inner ring 2 and the outer ring 3 are supported in a relatively rotatable manner and the rotational resistance (rotation torque) is reduced by the rolling of the rolling bodies 4. The annular space S defined between the inner ring 2 and the outer ring 3 is sealed by the seals 6, 6. With such a configuration, intrusion of foreign substances such as dust and moisture into the annular space S from the outside is prevented and, at the same time, leakage of grease held in the annular space S to the outside is prevented.

In the present embodiment, the seal 6 includes the auxiliary lip 15. The auxiliary lip 15 is in a non-contact state with a minute gap H formed between the auxiliary lip 15 and the inner ring 2. With such a configuration, the auxiliary lip 15 inhibits intrusion of foreign substances from the outside and, at the same time, reduces external pressure acting on the main lip 16. As shown in FIG. 4A, the auxiliary lip 15 is configured such that the inclination angle $\alpha 1$ between the surface of the auxiliary lip 15 disposed outward in the axial direction and the outer peripheral surface 2A of the inner ring 2 is smaller than the inclination angle $\beta 1$ between the surface of the auxiliary lip 15 disposed inward in the axial direction and the outer peripheral surface 2A of the inner ring 2. With such a configuration, foreign substances or a liquid easily stagnate on the outer side having a smaller inclination angle ($\alpha 1 < \beta 1$) and hence, it is possible to effectively inhibit intrusion of foreign substances such as dust and moisture from the outside. Further, the auxiliary lip 15 is disposed in the inner side of the core metal 10 in the radial direction, and the core metal 10 extends to an area in the vicinity of the auxiliary lip 15. Accordingly, rigidity of the auxiliary lip 15 is increased by the core metal 10 so that the auxiliary lip 15 can acquire a stable sealing performance.

On the other hand, the main lip 16 is disposed on the thick wall portion 13A side. However, the annular groove 18 is formed between the main lip 16 and the thick wall portion 13A thus forming the flexible portion 19 having a small wall thickness at the root portion of the main lip 16. With such a configuration, a contact pressure between the main lip 16 and the inner ring 2 is lowered so that a sliding resistance is reduced and hence, a rotation torque of the inner ring 2 can be reduced. In the present embodiment, as described above, the auxiliary lip 15 inhibits intrusion of foreign substances such as dust and moisture from the outside and, at the same time, reduces external pressure acting on the main lip 16. Accordingly, a required sealing performance can be ensured by the main lip 16. As shown in FIG. 4B, the main lip 16 is configured such that the inclination angle $\beta 2$ between the surface of the main lip 16 disposed inward in the axial direction and the outer peripheral surface 2A of the inner ring 2 is smaller than the inclination angle α2 between the surface of the main lip 16 disposed outward in the axial direction and the outer peripheral surface 2A of the inner ring 2. With such a configuration, a liquid or the like easily stagnates on the inner side having a smaller inclination angle (β2<α2) and hence, it is possible to effectively inhibit leakage of a grease held in the annular space S.

With the formation of the annular groove 18 between the main lip 16 and the thick wall portion 13A, the flexible portion 19 having a small wall thickness is formed so that flexibility of the main lip 16 is increased. Rigidity of the entire seal 6 is increased by the thick wall portion 13A formed on the inner side of the seal portion 13 in the axial direction and hence, the seal 6 can maintain a stable sealing performance. Further, the thick wall portion 13A is formed adjacent to the annular groove 18. With such a configuration, an amount of deflection of the main lip 16 is restricted by the thick wall portion 13A so that curling-up of the main lip 16 is prevented and, at the same time, it is possible to prevent a grease located in the annular space S from excessively adhering to the main lip 16. Further, when the rolling bearing 1 has a small size having an outer diameter of approximately 10 mm, the thickness of the core metal 10 and the thickness of the elastic member 11 are extremely small. However, by forming the thick wall portion 13A on the inner side of the seal portion 13 in the axial direction, connectivity between the core metal 10 and the elastic member 11 is ensured. Accordingly, the seal 6 can be easily manufactured by press molding or the like.

Figure 5C:
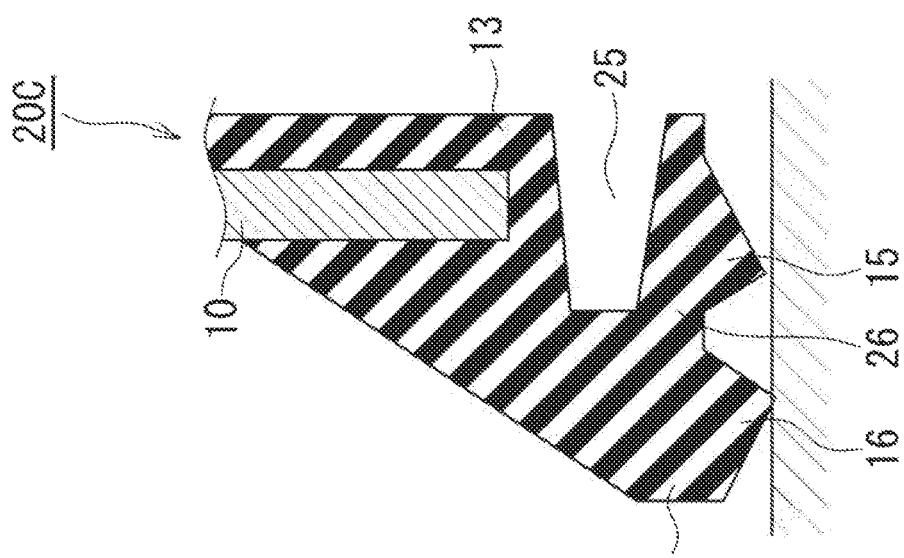
FIG. 5A to FIG. 5C are enlarged cross-sectional views showing essential parts of seals respectively mounted on comparative examples 1 to 3 used in a torque measurement test and a dust test performed on the rolling bearing of the embodiment.
Figure 5B:
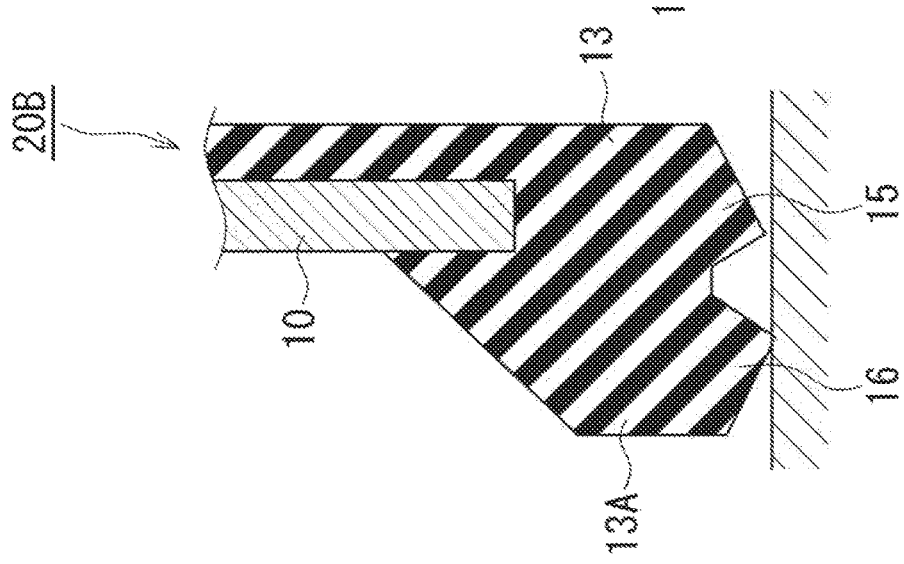
Figure 5A:
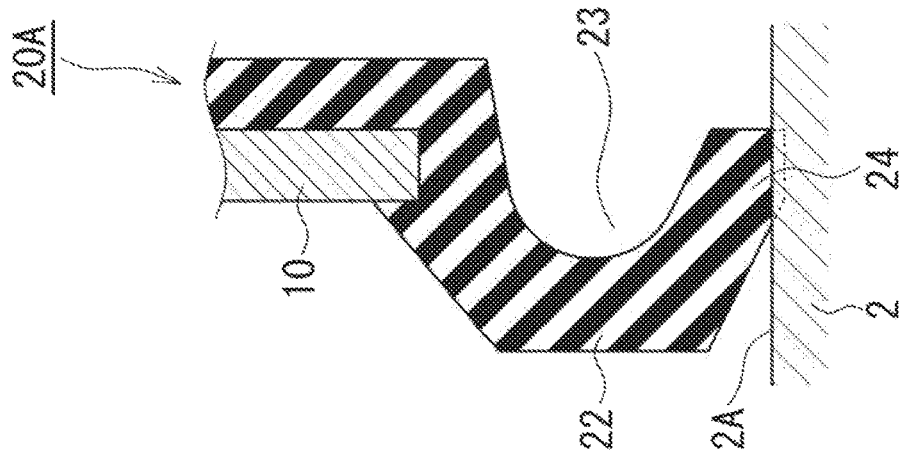

Next, the description is made with respect to a torque measurement test and a dust test performed to compare a sealing performance between the rolling bearing 1 of the above-mentioned embodiment and rolling bearings (comparative examples 1 to 3) respectively provided with seals shown in FIG. 5A to FIG. 5C. The seals 20A to 20C shown in FIG. 5A to FIG. 5C differ from the seal 6 in the present embodiment only with respect to the shape of the inner peripheral portion of the seal 6. Accordingly, in the description made hereinafter, the same reference numerals are given to corresponding portions appropriately, and the description of the similar portions is omitted.

The seal 20A shown in FIG. 5A is a standard seal mounted on a rolling bearing. A seal portion 22 is disposed in the axially inner side of the core metal 10. An annular groove 23 is formed on the axially outer side of the seal portion 22 so that the seal portion 22 has a curved cross sectional shape which projects inward in the axial direction. The seal portion 22 only includes a single main lip 24 contacting the outer peripheral surface 2A of the inner ring 2, and includes no auxiliary lip 15. A contact width of the main lip 24 with the outer peripheral surface 2A of the inner ring 2 in the axial direction is larger than a contact width of the main lip 16 of the seal 6 in the present embodiment. Further, the distance between an inner periphery edge portion of the core metal 10 and the outer peripheral surface 2A of the inner ring 2 is slightly larger than the corresponding distance in the seal 6 in the present embodiment. Hereinafter, a rolling bearing provided with seals 20A shown in FIG. 5A on both sides of the rolling bearing in the axial direction is referred to as "comparative example 1".

Different from the seal 6 in the present embodiment, in the seal 20B shown in FIG. 5B, the thick wall portion 13A of the seal portion 13 has no annular groove 18 on the inner side in the axial direction. Accordingly, the main lip 16 includes no flexible portion 19 having a small wall thickness. Hereinafter, a rolling bearing provided with seals 20B shown in FIG. 5B on both sides of the rolling bearing in the axial direction is referred to as "comparative example 2".

Different from the seal 6 in the present embodiment, in the seal 20C shown in FIG. 5C, the thick wall portion 13A of the seal portion 13 has no annular groove 18 on the axially inner side, and an annular groove 25 is formed on the axially outer side of the thick wall portion 13A instead. Accordingly, the main lip 16 contacting the outer peripheral surface 2A of the inner ring 2 includes no flexible portion 19 having a small wall thickness, while the auxiliary lip 15 not contacting the outer peripheral surface 2A of the inner ring 2 includes a flexible portion 26 having a small wall thickness instead. Hereinafter, a rolling bearing provided with seals 20C shown in FIG. 5C on both sides of the rolling bearing in the axial direction is referred to as "comparative example 3".

Each of the rolling bearing 1 of the present embodiment and the comparative examples 1 to 3 is a deep groove ball bearing having an inner diameter of 3 mm, and an outer diameter of 8 mm. To evaluate a sealing performance of these bearings, the following torque measurement test and dust test are performed.

(1) Torque Measurement Test

Figure 6:
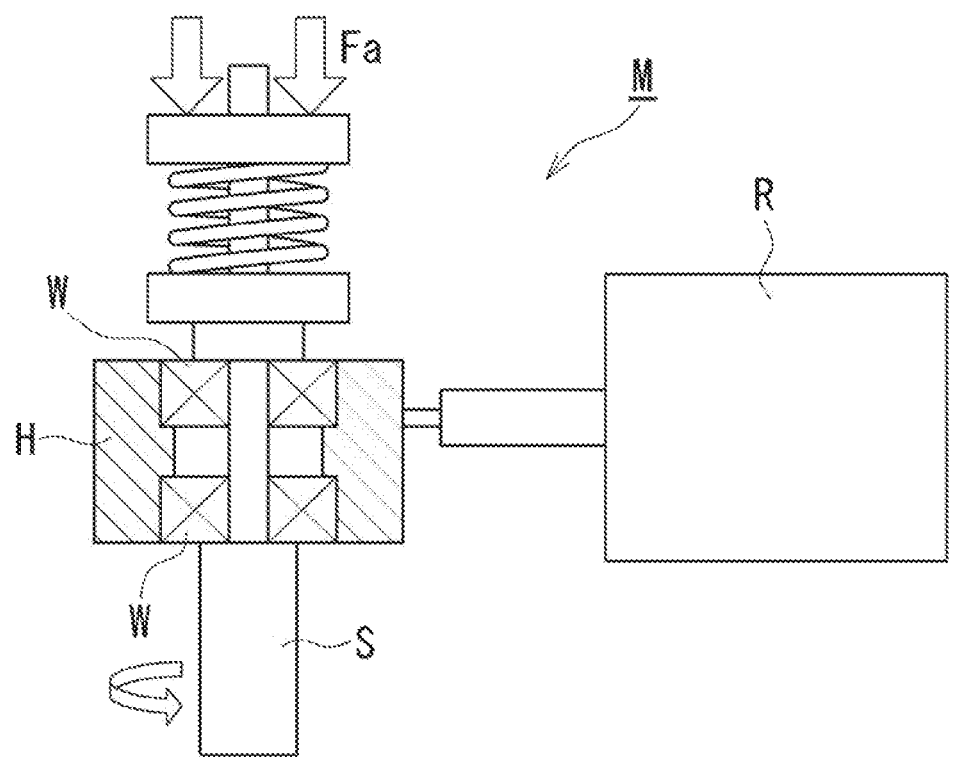
FIG. 6 is a schematic view of a test device used in the torque measurement test performed on the rolling bearing of the present embodiment and the comparative examples.

Rotation torques of each of the rolling bearing 1 and the comparative examples 1 to 3 are measured using a measuring device M shown in FIG. 6. As shown in FIG. 6, the measuring device M is configured as follows. Two bearings W, each performing a test, form one set of bearings. Outer rings of the respective bearings W are inserted into a cylindrical housing H at both end portions thus being fitted in an inner periphery of the housing H. A shaft S rotationally driven by a drive motor is inserted and fitted in inner rings. The shaft S is rotated at 10000 rpm in a state where a preload Fa (F=2N) is applied to the inner rings. A tangential force acting on the housing H mounted on the outer rings is measured by a measuring machine R using a load cell and, based on the measured tangential force, a rotation torque for each two bearings is calculated. The calculated rotation torque for two bearings is divided by 2 thus obtaining a rotation torque for one bearing. A rotation torque is measured in an environment at a normal temperature and a normal humidity. A measurement is performed ten times for each bearing, and an average value for each bearing is calculated. A rotation torque is expressed by a relative value assuming a rotation torque of the comparative example 1 (standard product) as a reference (100). It is desirable for a bearing to have a rotation torque lower than a rotation torque of the comparative example 1, that is, lower than 100. The rotation torque measurement results are shown in FIG. 7.

(2) Dust Test

In the dust test, each of the rolling bearing 1 according to the present embodiment and the comparative examples 1 to 3 is suspended by a thread in a desiccator, and test dust is made to circulate by a fan motor in the desiccator for one hour. JIS test dust 1 (Kanto Loam Class 8) specified by JIS Z 8901 is used as test dust. Anderon values of each bearing before and after the dust test are measured by an Anderon meter thus performing an acoustic evaluation based on an amount of increase in Anderon value between before and after the dust test. In the test, a smaller amount of increase in Anderon value indicates that a degree of roughness on a race surface caused by test dust is smaller. That is, it can be evaluated that an amount of fine dust intrusion is smaller. The acoustic evaluation in the dust test is performed in M band (300 to 1800 Hz) and H band (1800 to 10000 Hz). The results of the dust test are shown in FIG. 8.

The following can be understood from the results of the torque measurement test shown in FIG. 7 and the results of the dust test shown in FIG. 8. The rolling bearing 1 of the present embodiment has a lower rotation torque than that of the comparative example 1 (standard product), and has a lower amount of increase in Anderon value (smaller amount of dust intrusion) than that of the comparative example 1. The comparative example 2 has a lower amount of increase in Anderon value than that of the comparative example 1 (smaller amount of dust intrusion). However, the comparative example 2 has a higher rotation torque than that of the comparative example 1. The comparative example 3 has a lower rotation torque than that of the comparative example 1. However, the comparative example 3 has a higher amount of increase in Anderon value than that of the comparative example 1 (larger amount of dust intrusion).

In the rolling bearing 1 of the present embodiment, the annular groove 18 is formed between the main lip 16 and the thick wall portion 13A thus forming the flexible portion 19. With such a configuration, a contact pressure of the main lip 16 with respect to the outer peripheral surface 2A of the inner ring 2 is lowered so that the sliding resistance can be reduced. Accordingly, the rotation torque can be reduced. Further, differently from the seal 20C of the comparative example 3, the annular groove 25 is not formed on the auxiliary lip 15 side. Therefore, rigidity of the auxiliary lip is ensured and hence, dust intrusion can be inhibited.

Figure 9:
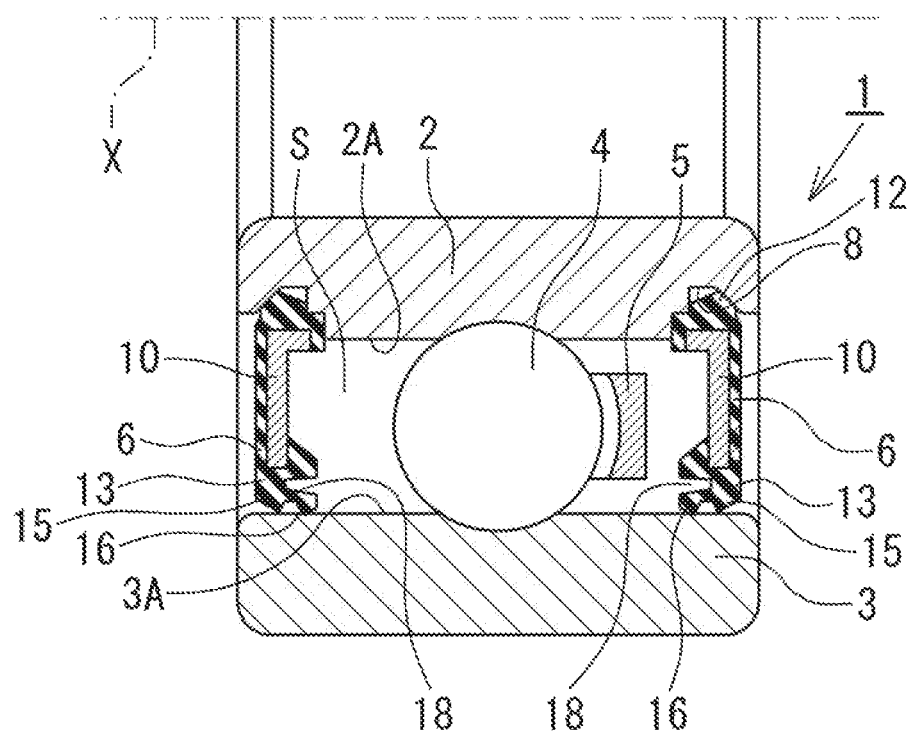
FIG. 9 is a partial cross-sectional view of a rolling bearing according to another embodiment of the present disclosure.

In the above-mentioned embodiment, the description refers to a case where the seals 6 are fixed to the outer ring 3. However, the present disclosure is not limited to such a case. As shown in FIG. 9, the present disclosure is also applicable to a case where the seals 6 are fixed to the inner ring 2 in the similar manner. In this case, seal grooves 8 where the seals 6 are fixed are formed on the inner ring 2. The inner peripheral surface 3A of the outer ring 3 forms a cylindrical surface. The fitting portion 12 is formed on the inner periphery side of each seal 6, and the seal portion 13 is formed on the outer periphery side of each seal 6. The auxiliary lip 15 is in a non-contact state with the inner peripheral surface 3A of the outer ring 3 forming a minute gap between the auxiliary lip 15 and the inner peripheral surface 3A. At the same time, the main lip 16 contacts the inner peripheral surface 3A of the outer ring 3. In FIG. 9, the same reference numerals are given to parts corresponding to the same parts in the embodiments shown in FIG. 1 to FIGS. 4A and 4B.

In the above-mentioned embodiment, the ball bearing is described as one example. However, the present disclosure is not limited to the ball bearing. For example, the present disclosure is also applicable in the similar manner to another rolling bearing such as a roller bearing.

According to the first and second aspects of the present disclosure, the auxiliary lip inhibits intrusion of moisture and foreign substances such as dust into a space between the inner ring and the outer ring and, at the same time, reduces the external pressure acting on the main lip, and the main lip seals the space defined between the inner ring and the outer ring to effectively inhibit leakage of grease held between the inner ring and the outer ring to the outside. The annular groove is formed between the thick wall portion and the main lip in the seal portion thus forming the flexible portion having a small wall thickness at the root portion of the main lip and hence, the sliding resistance of the main lip can be reduced. The auxiliary lip in a non-contact state is formed on the inner periphery side (the first aspect) or the outer periphery side (the second aspect) of the core metal and hence, rigidity of the auxiliary lip is increased whereby the auxiliary lip can acquire a stable sealing performance. The thick wall portion is formed on the inner side of the core metal in the axial direction so that rigidity of the entire seal is increased and hence, the seal can acquire a stable sealing performance and, at the same time, connectivity between the elastic member and the core metal can be improved. Further, as the thick wall portion is formed adjacent to the annular groove, curling-up of the main lip is prevented and, at the same time, it is possible to prevent grease adhering excessively to the main lip.

According to a further aspect of the present disclosure, it is possible to provide a rolling bearing provided with the above-mentioned seal.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An annular seal for a rolling bearing having an inner ring and an outer ring, wherein the seal is to be fixed to the outer ring for sealing a space defined between the inner ring and the outer ring, the seal comprising:
   an annular core metal extending between the inner ring and the outer ring; and
   an elastic member configured to cover at least a portion of the core metal, wherein
   the elastic member includes a seal portion configured to cover an inner surface and an outer surface of an inner peripheral portion of the core metal in an axial direction of the rolling bearing,
   the seal portion includes a thick wall portion configured to cover the inner surface of the core metal, the thick wall portion being thicker than a portion of the seal portion covering the outer surface of the core metal,
   an auxiliary lip and a main lip are formed in an inner peripheral portion of the seal portion, wherein the auxiliary lip is in a non-contact state in relation to an outer peripheral surface of the inner ring with a gap between the auxiliary lip and the outer peripheral surface, the main lip is formed at an axially inner side of the auxiliary lip and the main lip has an edge portion that contacts the outer peripheral surface of the inner ring,
   a peripheral groove is formed between the auxiliary lip and the main lip,
   an annular groove opening toward the inner side in the axial direction is formed between the thick wall portion and the main lip of the seal portion thus forming a flexible portion having a small wall thickness at a root portion of the main lip, wherein the small wall thickness is smaller than a thickness in a radial direction of the rolling bearing from the annular groove to the edge portion of the main lip, and
   the flexible portion is formed between the peripheral groove and the annular groove.

2. The annular seal of claim 1, wherein the peripheral groove is formed at the inner peripheral portion of the seal portion and opens radially toward the inner ring.

3. A rolling bearing comprising
   an annular seal according to claim 1, the inner ring, and the outer ring,
   wherein the seal is disposed between the outer and inner rings and is fixed to the outer ring, and
   wherein an inclination angle between a surface of an edge portion of the auxiliary lip disposed outward in the axial direction of the rolling bearing and the outer peripheral surface of the inner ring is smaller than an inclination angle between a surface of the edge portion of the auxiliary lip disposed inward in the axial direction of the rolling bearing and the outer peripheral surface of the inner ring.

4. A rolling bearing comprising
an annular seal according to claim 1, the inner ring, and the outer ring,
wherein the seal is disposed between the outer and inner rings and is fixed to the outer ring, and
wherein an inclination angle between a surface of the edge portion of the main lip disposed inward in the axial direction of the rolling bearing and the outer peripheral surface of the inner ring is smaller than an inclination angle between a surface of the edge portion of the main lip disposed outward in the axial direction of the rolling bearing and the outer peripheral surface of the inner ring.

5. A rolling bearing comprising
an annular seal according to claim 1, the inner ring, and the outer ring,
wherein the seal is disposed between the outer and inner rings and is fixed to the outer ring.

6. An annular seal for a rolling bearing having an inner ring and an outer ring, wherein the seal is to be fixed to the inner ring for sealing a space defined between the inner ring and the outer ring, the seal comprising:
an annular core metal extending between the inner ring and the outer ring; and
an elastic member configured to cover at least a portion of the core metal, wherein
the elastic member includes a seal portion configured to cover an inner surface and an outer surface of an outer peripheral portion of the core metal in an axial direction of the rolling bearing,
the seal portion includes a thick wall portion configured to cover the inner surface of the core metal, the thick wall portion being thicker than a portion of the seal portion covering the outer surface of the core metal,
an auxiliary lip and a main lip are formed in an outer peripheral portion of the seal portion, wherein the auxiliary lip is in a non-contact state in relation to an inner peripheral surface of the outer ring with a gap between the auxiliary lip and the inner peripheral surface of the outer ring, the main lip is formed at an axially inner side of the auxiliary lip and the main lip has an edge portion that contacts the inner peripheral surface of the outer ring,
a peripheral groove is formed between the auxiliary lip and the main lip, and
an annular groove opening toward the inner side in the axial direction is formed between the thick wall portion and the main lip of the seal portion thus forming a flexible portion having a small wall thickness at a root portion of the main lip, wherein the small wall thickness is smaller than a thickness in a radial direction of the rolling bearing from the annular groove to the edge portion of the main lip, and
the flexible portion is formed between the peripheral groove and the annular groove.

7. The annular seal of claim 6, wherein the peripheral groove is formed at the outer peripheral portion of the seal portion and opens radially toward the outer ring.

8. A rolling bearing comprising
an annular seal according to claim 6, the inner ring, and the outer ring,
wherein the seal is disposed between the outer and inner rings and is fixed to the inner ring, and
wherein an inclination angle between a surface of an edge portion of the auxiliary lip disposed outward in the axial direction of the rolling bearing and the inner peripheral surface of the outer ring is smaller than an inclination angle between a surface of the edge portion of the auxiliary lip disposed inward in the axial direction of the rolling bearing and the inner peripheral surface of the outer ring.

9. A rolling bearing comprising
an annular seal according to claim 6, the inner ring, and the outer ring,
wherein the seal is disposed between the outer and inner rings and is fixed to the inner ring, and
wherein an inclination angle between a surface of the edge portion of the main lip disposed inward in the axial direction of the rolling bearing and the inner peripheral surface of the outer ring is smaller than an inclination angle between a surface of the edge portion of the main lip disposed outward in the axial direction of the rolling bearing and the inner peripheral surface of the outer ring.

10. A rolling bearing comprising
an annular seal according to claim 6, the inner ring, and the outer ring,
wherein the seal is disposed between the outer and inner rings and is fixed to the inner ring.

* * * * *